United States Patent
Lee et al.

(10) Patent No.: US 7,754,354 B2
(45) Date of Patent: Jul. 13, 2010

(54) PATTERNED MEDIUM AND METHOD OF MANUFACTURING THE SAME

(75) Inventors: Byung-kyu Lee, Gangnam-gu (KR); No-yeol Park, Seongnam-si (KR); Jin-seung Sohn, Gangnam-gu (KR); Seong-yong Yoon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 539 days.

(21) Appl. No.: 11/652,586

(22) Filed: Jan. 12, 2007

(65) Prior Publication Data

US 2007/0172704 A1 Jul. 26, 2007

(30) Foreign Application Priority Data

Jan. 26, 2006 (KR) .................. 10-2006-0008244

(51) Int. Cl.
    *G11B 5/64* (2006.01)
(52) U.S. Cl. .................. 428/826; 428/836; 428/212
(58) Field of Classification Search .................. None
    See application file for complete search history.

(56) References Cited

U.S. PATENT DOCUMENTS 6,420,058 B1 * 7/2002 Haratani et al. .......... 428/845.6
7,161,753 B2 * 1/2007 Wachenschwanz et al. .... 360/48
7,572,499 B2 * 8/2009 Bandic et al. ............... 428/172

FOREIGN PATENT DOCUMENTS

| CN | 1725305 A | 1/2006 |
|---|---|---|
| JP | 2005-100499 A | 4/2005 |
| JP | 2005-293633 A | 10/2005 |

\* cited by examiner

*Primary Examiner*—Kevin M Bernatz
(74) *Attorney, Agent, or Firm*—Sughrue Mion, PLLC

(57) ABSTRACT

A patterned medium and a method of manufacturing the same are provided. The patterned medium includes a data region having a plurality of recording dots arrayed along a plurality of tracks; and a non-data region comprising a part of the patterned medium other than the data region, the non-data region having a plurality of pattern marks. The method includes depositing an aluminum layer on a base substrate; depositing a photo-resist on the aluminum layer; forming a pattern on the photo-resist using a lithography process; forming a fine pattern by forming a plurality of cavities on a portion of the aluminum layer which is exposed through the photo-resist; removing the photo-resist; forming a mold pattern; imprinting the mold pattern on a media substrate to form cavities on the media substrate; and filling the cavities with a recording material.

8 Claims, 4 Drawing Sheets

PATTERNED MEDIUM AND METHOD OF MANUFACTURING THE SAME

CROSS-REFERENCE TO RELATED PATENT APPLICATION

This application claims priority from Korean Patent Application No. 10-2006-0008244, filed on Jan. 26, 2006, in the Korean Intellectual Property Office, the disclosure of which is incorporated herein in its entirety by reference.

BACKGROUND OF THE INVENTION

1. Field of the Invention

Media and methods consistent with the present invention relate to a patterned medium and a method of manufacturing the same, and more particularly, a high recording density patterned medium on which a nano-scale recording pattern and a servo pattern for obtaining location information of a head relative to a target track are formed and a method of manufacturing such a high recording density patterned medium.

2. Description of the Related Art

With information devices such as computers quickly improving in performance, there is a need for a high-density information storage medium. Recently, a patterned medium in which bits are physically spaced apart from each other by a predetermined pitch by forming a pattern such that recording and information maintenance can be easily achieved under high recording density conditions has been actively studied.

In order to increase the recording density of the patterned media, the size of the unit pattern corresponding to one bit must be designed to a nano-scale. That is, in order to realize a high recording density greater than 1 Tb/in2, a fine patterning technology for realizing a 25 nm pitch is essentially required. However, it is difficult to realize a fine pattern less than 100 nm using the currently used lithography technology. For example, a photo-resist is thinly deposited on a substrate and the photo-resist is exposed to light emitted through a predetermined pattern to form a physical pattern on the substrate through a developing process. Therefore, the resolution obtained by the above mentioned process is limited by the wave of light.

Meanwhile, a read/write head reads and writes data from or to the patterned medium while a read/write head follows a target track. At this point, the read/write head may stray from the target track due to an external impact or an internal operation error. To prevent this tracking error, there is a need to form a servo pattern for obtaining location information of the head on the patterned medium. Since the servo pattern performs a different function than the recording pattern, the pattern shape and size of the servo pattern are different from those of the recording pattern for the data region. Therefore, there is a need to apply a different process for the servo patterns than for the recording patterns.

SUMMARY OF THE INVENTION

The present invention provides a high recording density patterned medium on which a nano-scale recording pattern and a servo pattern for obtaining a location information of a head are formed and a method of manufacturing such a high recording density patterned medium without incurring high costs.

According to an aspect of the present invention, there is provided a patterned medium including: a data region having a plurality of recording dots arrayed along a plurality of tracks, wherein each recording dot has an aspect ratio less than 2:1; and a non-data region, which is a part of the patterned medium except for the data region, having a plurality of pattern marks, wherein each pattern mark has an aspect ratio that is a relative ratio between a longitudinal length and a lateral length and greater than 2:1.

According to another aspect of the present invention, there is provided a method of manufacturing a patterned medium having data and non-data regions of with different pattern scales, including: depositing an aluminum layer on a base substrate; depositing a photo-resist on the aluminum layer; forming a pattern corresponding to the non-data region on the photo-resist using a lithography process; forming a fine pattern corresponding to the data region by forming a plurality of cavities on an exposed portion of the aluminum layer through the photo-resist; removing the photo-resist; forming a mold pattern using the pattern formed on the aluminum layer; imprinting the mold pattern on a media substrate to form cavities on the media substrate; and filling the cavities formed on the media substrate with a recording material to flatten a surface of the media substrate.

BRIEF DESCRIPTION OF THE DRAWINGS

The above and other aspects of the present invention will become more apparent by describing in detail certain exemplary embodiments thereof with reference to the attached drawings in which.

DETAILED DESCRIPTION OF EXEMPLARY EMBODIMENTS OF THE INVENTION

The present invention will now be described more fully with reference to the accompanying drawings, in which exemplary embodiments of the invention are shown.

Figure 1:
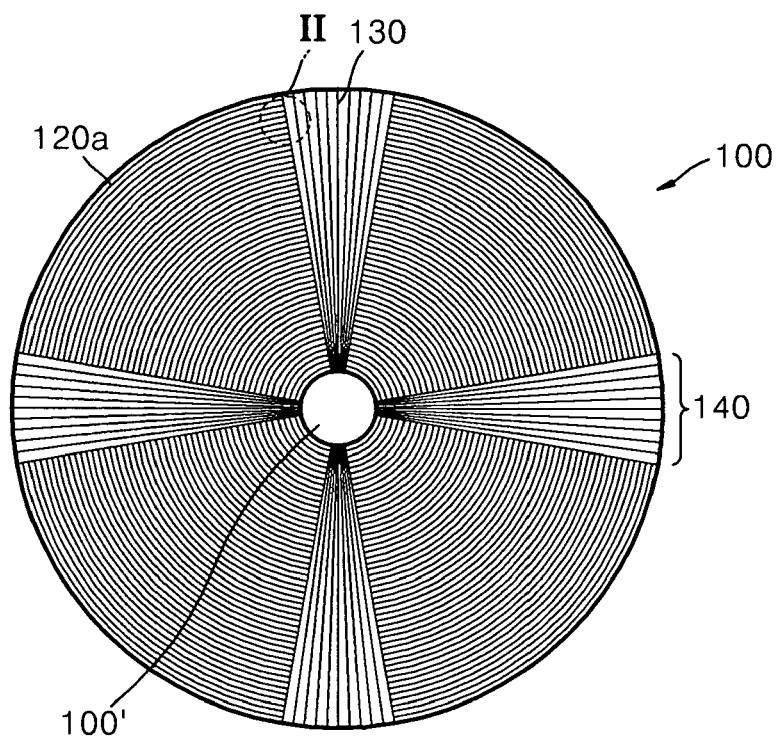
FIG. 1 illustrates a top view of a patterned medium according to an exemplary embodiment of the present invention.

FIG. 1 illustrates a top view of a patterned medium according to an exemplary embodiment of the present invention.

Referring to FIG. 1, a patterned medium 100 of an exemplary embodiment of the present invention includes a center hole 100' for assembling with a spindle motor (not shown) and a plurality of recording tracks 120a formed concentrically with the center hole 100'. A read/write head (not shown) reads and writes data from or to the patterned medium 100 while the read/write head follows a target track formed on the patterned medium 100 rotating at a high speed. A plurality of servo regions 140 is formed on the patterned medium 100. The servo regions 140 extend from the center hole 100' to the outermost circumference of the patterned medium 100 in a radial direction and are spaced apart at an angle, which may be predetermined. The servo regions 140 function to detect and correct a location error between the read/write head and the target track, which is caused by the eccentricities of the patterned medium 100 assembled with the center of the spindle motor. To realize the functionality of the servo regions 140, each of the servo regions 140 is provided with a plurality of servo patterns 130 extending in the radial direction and crossing the recording tracks 120a.

Figure 2:
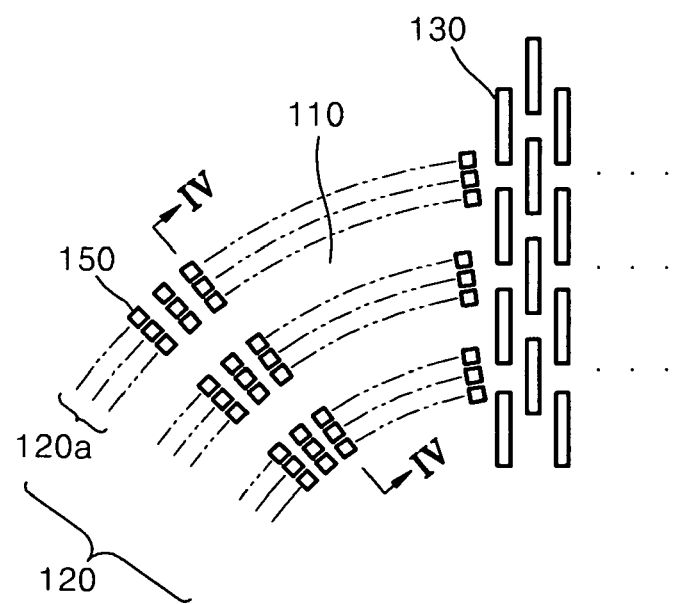
FIG. 2 illustrates an enlarged view of a circled portion II of FIG. 1.

FIG. 2 illustrates an enlarged view of a circled portion II of FIG. 1.

Referring to FIG. 2, a plurality of recording dots 150 are arrayed along the recording tracks. One or more rows of the recording dots 150 form one of the recording tracks 120a and the plurality of the recording tracks 120a form a data region 120 where the data can be effectively recorded. The recording dots 150 are formed of a recording material that can record and update the data. For example, the recording dots 150 may be formed of a magnetic material that can be magnetized by reacting with a leakage flux of the read/write head or a high dielectric material having a permittivity different from that of a surrounding matrix. The recording dots 150 may be formed in a polygonal shape including a tetragonal shape as shown in FIG. 2 and a hexagonal shape. However, other shapes for the recording dots 150 are also contemplated. The aspect ratio of each of the recording dots 150 may be approximately 1:1, but, less than approximately 2:1.

While the read/write head reads or writes the data, the read/write head may deviate from the desired recording track due to an external impact or an internal operation error. In order to prevent such a tracking error, track separation patterns 110 are concentrically formed between the adjacent recording tracks 120a. It is advantageous for the track separation pattern 110 to have an aspect ratio greater than approximately 2:1.

The servo patterns 130 crossing the recording tracks 120a extend over, for example, more than two adjacent recording tracks 120a. Unlike the recording dots 150 of the recording tracks 120a, the servo patterns 130 do not have a data storage function. That is, the servo patterns 130 are located on the patterned medium 100 to detect the relative location information between the read/write head and the target track. Therefore, the servo patterns 130 and the track separation patterns 110 form a non-data region.

As described above, the patterned medium 100 is generally divided into the data region 120 and the non-data region. The data reason is formed by the recording tracks 120a. And the non-data region is formed by the track separation patterns 110 formed between the recording tracks 120a and the servo pattern 130 for aligning a relative location between the patterned medium 100 and the spindle motor for driving the patterned medium 100.

The location signal of the read/write head, which is induced by the track separation patterns 110 and the servo patterns 130, is transmitted to a control loop of an actuator (not shown) driving the read/write head and is then converted into a driving signal for correcting the location error between the read/write head and the target track. The servo pattern 130 may also have an aspect ratio greater than 2:1. Meanwhile, the height difference or the surface roughness difference between the recording dot 150 of the data region 120 and the track separation pattern 110 or the servo pattern 130 of the non-data region may be less than 50 Å so that, when data, which may be predetermined, is read from the patterned medium, an effective reading quality can be ensured by suppressing noise of the converted electric signal.

Figure 3:
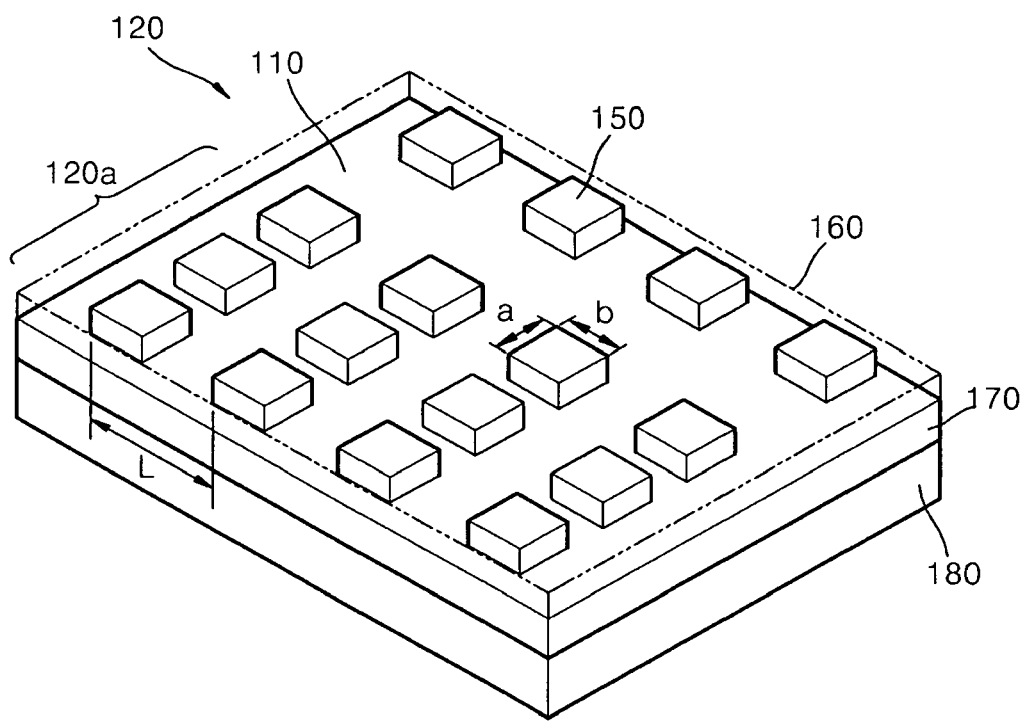
FIG. 3 illustrates an enlarged perspective view of the recording tracks of FIG. 2.
Figure 4:
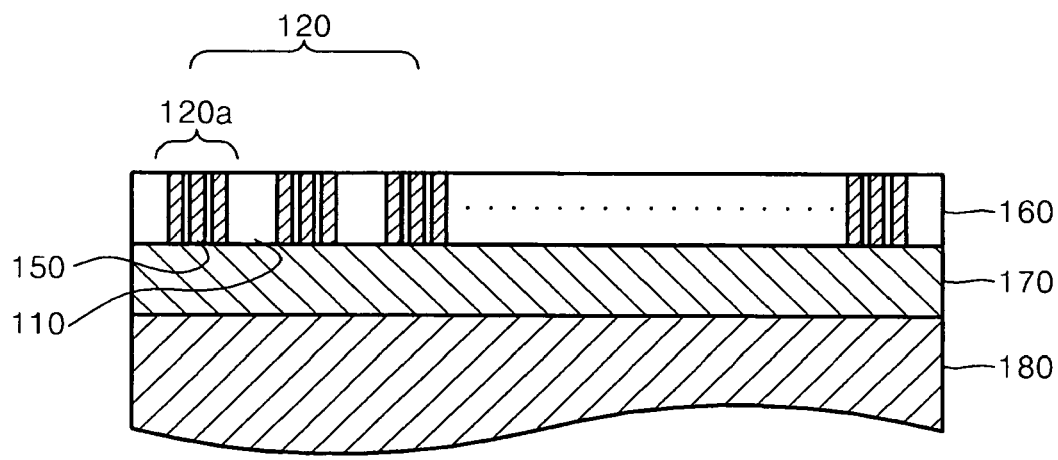
FIG. 4 illustrates a sectional view taken along line IV-IV of FIG. 2.

FIG. 3 illustrates an enlarged perspective view of the recording track of FIG. 2 and FIG. 4 illustrates a sectional view taken along line IV-IV of FIG. 2.

The recording dots 150 that are formed to a nano-scale are densely arrayed along the recording tracks 120a. In order to form the patterned medium 100 having above approximately a 1 Tb/in2 recording density, it is advantageous for the bit length L including the length of a unit recording dot 150 to be less than approximately 25 nm. The recording dot 150 may have a polygonal cross-section. However, other cross-section shapes are also contemplated. The recording dots 150 are formed through a high-resolution patterning process such as an anodic oxide coating (AAO) process or a block copolymer process as will be described later in more detail.

Figure 5:
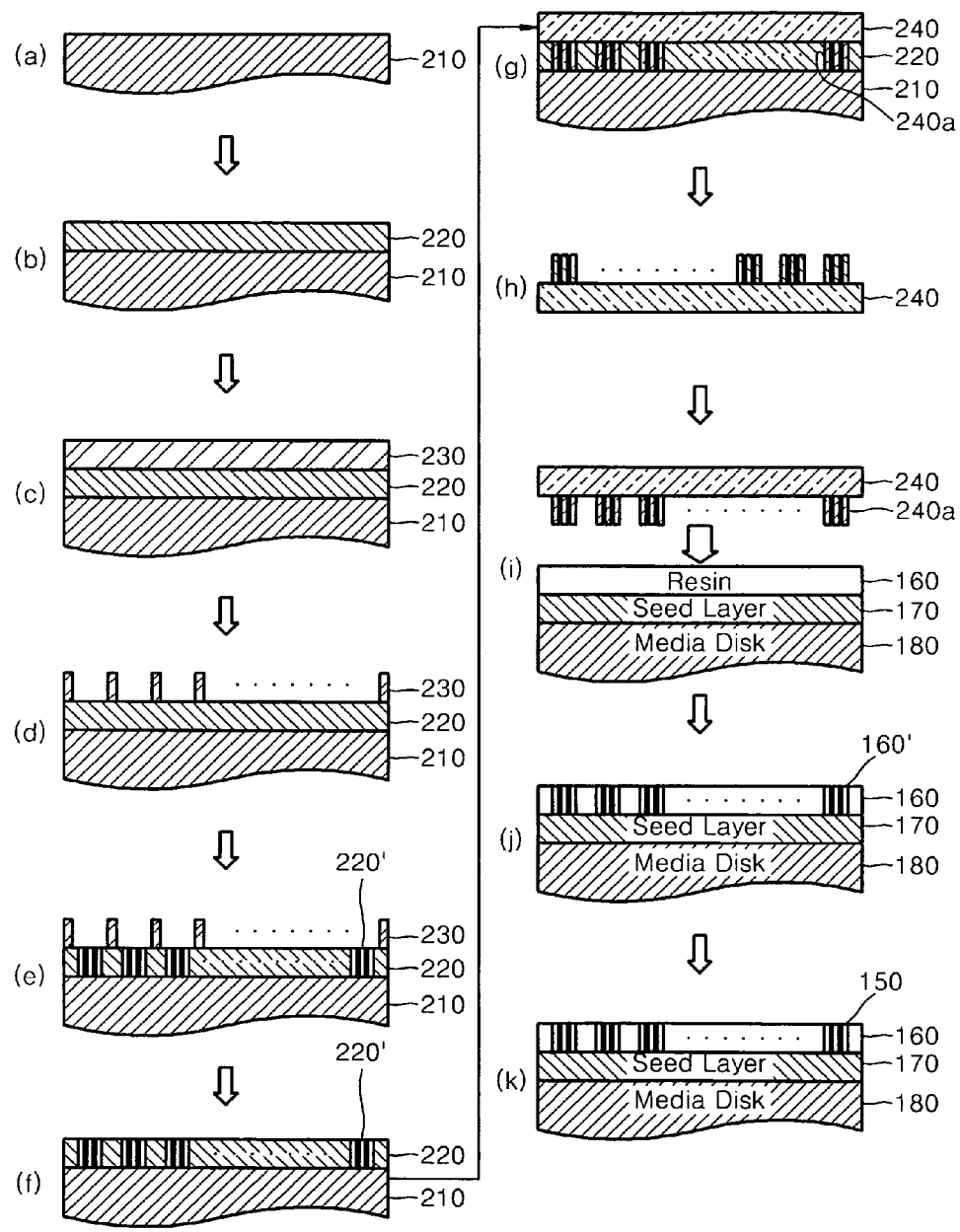
FIG. 5 is a view illustrating a method of manufacturing a patterned media according to an exemplary embodiment of the present invention.

FIG. 5 is a view illustrating a method of manufacturing a patterned media according to an exemplary embodiment of the present invention.

According to an exemplary embodiment, the non-data region is first patterned and then, the data region is finely patterned.

An aluminum layer 220 is deposited on a base substrate 210 formed of glass or quartz (see diagrams (a) and (b) of FIG. 5). Then, a photo-resist 230 is deposited on the aluminum layer 220 and a pattern is formed on the photo-resist 230 through a well-known lithography process such as a photolithography process, an E-beam lithography process, an X-ray lithography process, an optical interference lithography process, or a focused ion beam (FIB) lithography process (see diagrams (c) and (d) of FIG. 5). The pattern may be predetermined. The lithography process may be selected based on the desired preciseness of the pattern or based on whichever process is most convenient.

Portions of the aluminum layer 220, which are covered by the photo-resist 230, remain even after the aluminum layer 220 is patterned to form the non-data region, for example, to form the track separation patterns 110, as will be described later in more detail.

After the pattern for the non-data region is formed, a fine pattern for the data region is formed through an electrochemical process such as the AAO process (see diagram (e) of FIG. 5). That is, the aluminum layer 220, on which the photo-resist 230 is deposited, is precipitated in electrolyte and a positive bias voltage is applied to the aluminum layer 220. Then, a plurality of nano-scale cavities 220' are formed in portions of the aluminum layer 220, which are exposed to the electrolyte through an opened pattern of the photo-resist 230 and an oxide film (not shown) is formed on the aluminum layer 220 by the reaction of the electrolyte and the aluminum layer 220. The nano-scale cavities 220' may be formed on defective portions of the aluminum layer 220, on which the oxide film cannot be easily formed, such as a portion which naturally contains impurities or on which notches are artificially formed. Alternatively, the nano-scale cavities 220' may be formed on a certain portion that is determined according to a crystal structure of the aluminum material forming the aluminum layer 220. The portion may be predetermined. The size of the nano-scale cavities 220' may vary depending on a condition of the AAO process, such as a type of electrolyte, an intensity of the bias voltage, a reaction temperature, or a reaction time. As shown in diagram (e) of FIG. 5, the cavities may be formed to a depth identical to the thickness of the aluminum layer 220. However, depths less than the thickness of the aluminum layer 220 are also contemplated. Each of the nano-scale cavities 220' may be formed having a polygonal section and arrayed in a uniform pattern throughout the whole surface of the aluminum layer 220. However, other cavity shapes are also contemplated. That is, when the section of each of the nano-scale cavities 220' is rectangular, an aspect ratio of the section of each of the nano-scale cavities 220' is approximately 1:1 to approximately 2:1.

In the AAO process, the photo-resist 230 functions as an etching mask by preventing the portions of the aluminum layer 220, which are covered by the photo-resist 230, from reacting with the electrolyte. Therefore, the portions covered by the photo-resist 230, for example, the track separation patterns 110 adjacent to the recording tracks 120a, remain as the non-data region. The patterns for the non-data region have a relatively high aspect ratio. That is, the track separation patterns 110 adjacent to the recording tracks 120a or the servo patterns 130 extending over at least two recording tracks 120a in the radial direction of the patterned medium 100 have an aspect ratio greater than 2:1.

In the above-description, the AAO process is used to form the data region 120. However, the present invention is not limited thereto. That is, any kinds of processes that are proper for nano-scale high-resolution patterning may be applied to the present inventive concept. For example, a block copolymer process may be applied to the present inventive concept. That is, a di-polymer formed by mixing two different polymers is exposed at a certain temperature, which may be predetermined, so that a phase separation occurs between first and second phases of different resistances against etching. For example, the first phase is separated from the second phase, which forms a surrounding matrix, in the course of which a plurality of dot patterns are formed. The first phase having a higher etching rate is removed through etching and developing processes, thereby forming a plurality of cavities arrayed in a pattern.

After the nano-scale cavities 220' are formed through, for example, the AAO process, the photo-resist 230 is removed and a metal layer 240 is formed on the aluminum layer 220, as shown in diagrams (f) and (g) of FIG. 5, through a well-known electroplating process. The metal layer 240 may be formed of a metallic material having a high thermal conductivity, such as nickel, a nickel alloy, or other similar material.

A part of the metal layer 240 fills the nano-scale cavities 220' formed on the aluminum layer 220 to form a relief mold pattern 240a.

The rest of the metal layer 240 is formed on the aluminum layer 220 to a certain thickness, which may be predetermined. The metal layer 240 having the relief mold pattern 240a is separated from the aluminum layer 220 to be used as a master substrate (see diagram (h) of FIG. 5).

Next, as shown in diagram (i) of FIG. 5, the relief mold pattern 240a on the metal layer 240 is imprinted on a resin layer 160, which is formed on a media disk 180 formed of, for example, glass. At this point, a seed layer 170 may be interposed between the media disk 180 and the resin layer 160 to allow a recording material (i.e., recording dots) 150 to be grown thereon on a seed layer 170, as will be described later in more detail.

By heating to a high temperature and pressing the metal layer 240 on the resin layer 160, the relief mold pattern 240a is imprinted on the resin layer 160 to form cavities 160' corresponding to the relief mold pattern 240a (see diagram (j) of FIG. 5). Then, the recording material (i.e., recording dots) 150, such as a magnetic material reacting with a leakage flux of the read/write head or a ferroelectric substance having a permittivity different from that of the resin layer 160 is filled in the cavities 160', to form a flattened recording surface (see diagram (k) of FIG. 5).

Figure 6:
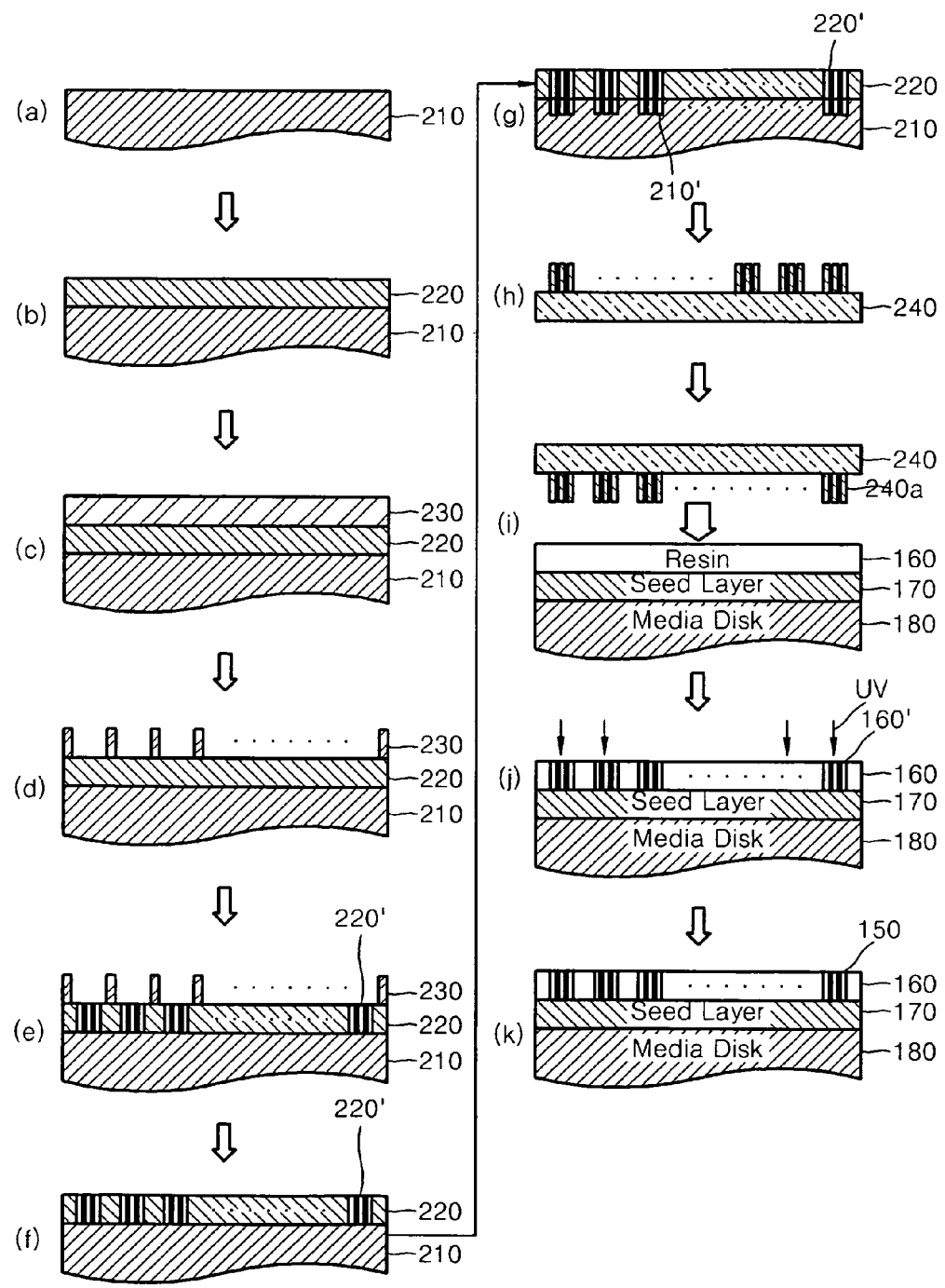
FIG. 6 is a view illustrating a method of manufacturing a patterned media according to another exemplary embodiment of the present invention.

FIG. 6 is a view illustrating a method of manufacturing a patterned media according to another exemplary embodiment of the present invention.

As a method for transferring a mold pattern of the master substrate, there is a method of imprinting the mold pattern on the soft resin layer using heat and pressure as described above and a method in which the mold pattern is imprinted on a radiation curing resin layer and the radiation curing resin layer is hardened ultraviolet rays. This second method will now be described with reference to FIG. 6.

Referring to FIG. 6, an aluminum layer 220 is deposited on a base substrate 210 formed of glass or quartz (see diagrams (a) and (b) of FIG. 6). Then, a photo-resist 230 is deposited on the aluminum layer 220 and a pattern for the non-data region is formed on the photo-resist 230 through one of a variety of possible lithography processes (see diagrams (c) and (d) of FIG. 5). After the pattern for the non-data region is completed, a fine cavity pattern for the data region is formed through an AAO process or a block copolymer process (see diagram (e) of FIG. 5).

After the fine cavity pattern is formed, the photo-resist 230 is removed (see diagram (f) of FIG. 5) and the base substrate 210 is dry-etched using the aluminum layer 220 as an etching mask. That is, exposed portions of the base substrate 210 exposed by cavities 220' of the aluminum layer 220 are etched to a certain depth in a certain pattern (see diagram (g) of FIG. 6). The depth and pattern may both be predetermined. An intaglio mold pattern 210' is formed on the base substrate 210 that may be used as a mold pattern to be imprinted on the radiation curing resin layer. Alternatively, as shown in diagrams (h) and (i) of FIG. 6, the intaglio mold pattern 210' formed on the base substrate 210 is duplicated into a relief mold pattern 240a of a metal layer 240 and the relief mold pattern 240a is imprinted on the radiation curing resin layer 160.

That is, the radiation curing resin layer 160 is formed on a media disk 180 formed of, for example, glass that can transmit light. A seed layer 170 may be interposed between the media disk 180 and the resin layer 160. The radiation curing resin layer 160 may be formed of a photosensitive resin material that can be hardened by reacting with UV light.

By heating to a high temperature and pressing the metal layer 240 on the resin layer 160, the relief mold pattern 240a is imprinted on the radiation curing resin layer 160 to form cavities 160' corresponding to the relief mold pattern 240a and UV light is emitted onto the radiation curing resin layer 160 (see diagram (j) of FIG. 6). A recording material 150, such as a magnetic material reacting with a leakage flux of the read/write head or a ferroelectric substance having a permittivity different from that of the radiation curing resin layer 160 is filled in the cavities 160' (see diagram (k) of FIG. 6) to form a flattened recording surface.

According to the present inventive concept, a nano-scale recording pattern and a high recording density above approximately 1 Tb/in2 can be achieved. The location information of the head can be accurately detected by a servo pattern and a track separation pattern to minimize a servo error of the head.

According to a method of manufacturing the patterned medium of the present inventive concept, the dot patterns of the data region and the pattern of the non-data region are processed through different methods. That is, the non-data region is patterned through a lithography process, after which the data region is fine-patterned using a nano-scale high density patterning method. Therefore, the high-density recording medium can be manufactured at a low cost.

While the present inventive concept has been particularly shown and described with reference to certain exemplary embodiments thereof, it will be understood by those of ordinary skill in the art that various changes in form and details may be made therein without departing from the spirit and scope of the present invention as defined by the following claims.

What is claimed is:

1. A patterned medium comprising:
   a data region having a plurality of recording dots arrayed along a plurality of tracks, wherein each recording dot has an aspect ratio less than 2:1; and
   a non-data region comprising a part of the patterned medium other than the data region, the non-data region having a plurality of pattern marks having an aspect ratio greater than 2:1, wherein both aspect ratios are the relative ratio between a longitudinal length and a lateral length of the respective dot or mark,
   wherein each of the longitudinal length and the lateral length is parallel to a plane of the patterned medium.

2. The patterned medium of claim 1, wherein the recording dots and the pattern marks have a polygonal shape.

3. The patterned medium of claim 1, wherein the non-data region comprises:
   a plurality of servo patterns extending in a radial direction crossing the plurality of tracks; and
   a plurality of track separation patterns formed between the plurality of tracks, wherein the plurality of track separation patterns are parallel with the tracks.

4. The patterned medium of claim 3, wherein the plurality of servo patterns are arrayed in a plurality of servo regions extending from a center hole to the outermost circumference of the patterned medium in a radial direction, the plurality of servo regions spaced apart from each other by a certain angle.

5. The patterned medium of claim 1, wherein a surface roughness difference between the recording dots of the data region and the pattern marks of the non-data region is less than 50 Å.

6. The patterned medium of claim 1, wherein the plurality of recording dots of the data region are formed through a fine patterning process having resolution less than a few tens of nano-meter and the pattern marks of the non-data region are formed through a lithography process.

7. The patterned medium of claim 6, wherein the fine patterning process is performed by an Anodic Aluminum Oxidation process or a block copolymer process.

8. The patterned medium of claim 1, wherein the pattern marks are formed between the recording dots within each data region.

* * * * *